US009522523B2

(12) United States Patent
Costy et al.

(10) Patent No.: US 9,522,523 B2
(45) **Date of Patent: *Dec. 20, 2016**

(54) LASER-IMAGEABLE FLEXOGRAPHIC PRINTING PRECURSORS AND METHODS OF IMAGING

(75) Inventors: Shai Costy, Tel Aviv (IL); Ophira Melamed, Shoham (IL)

(73) Assignee: EASTMAN KODAK COMPANY, Rochester, NY (US)

( * ) Notice: Subject to any disclaimer, the term of this patent is extended or adjusted under 35 U.S.C. 154(b) by 851 days.

This patent is subject to a terminal disclaimer.

(21) Appl. No.: 13/459,318

(22) Filed: Apr. 30, 2012

(65) Prior Publication Data

US 2013/0288033 A1 Oct. 31, 2013

(51) Int. Cl.

| | |
|---|---|
| ***B29C 59/16*** | (2006.01) |
| ***B41C 1/05*** | (2006.01) |
| ***B41N 1/12*** | (2006.01) |
| *B41N 1/22* | (2006.01) |

(52) U.S. Cl.

CPC . *B41C 1/05* (2013.01); *B41N 1/12* (2013.01); *B41N 1/22* (2013.01); *Y10T 428/249921* (2015.04); *Y10T 428/31696* (2015.04); *Y10T 428/31931* (2015.04); *Y10T 442/20* (2015.04)

(58) Field of Classification Search

CPC .................................................... B29C 56/16
USPC ....................................................... 264/400
See application file for complete search history.

(56) References Cited

U.S. PATENT DOCUMENTS

| | | | | |
|---|---|---|---|---|
| 5,719,009 | A | 2/1998 | Fan | |
| 5,798,202 | A | 8/1998 | Cushner et al. | |
| 6,223,655 | B1 | 5/2001 | Shanbaum et al. | |
| 6,776,095 | B2 | 8/2004 | Telser et al. | |
| 6,913,869 | B2 | 7/2005 | Leinenbach et al. | |
| 6,935,236 | B2 | 8/2005 | Hiller et al. | |
| 7,223,524 | B2 | 5/2007 | Hiller et al. | |
| 2002/0018958 | A1 | 2/2002 | Nishioka et al. | |
| 2003/0054153 | A1* | 3/2003 | Kuczynski ............... | B41N 1/12 428/304.4 |
| 2005/0277061 | A1 | 12/2005 | Nishioka et al. | |
| 2007/0196630 | A1* | 8/2007 | Hayes ..................... | B32B 17/10 428/195.1 |
| 2010/0075117 | A1 | 3/2010 | Kawashima et al. | |
| 2011/0089609 | A1 | 4/2011 | Landry-Coltrain et al. | |
| 2011/0236705 | A1 | 9/2011 | Melamed et al. | |
| 2011/0274845 | A1 | 11/2011 | Melamed et al. | |
| 2012/0103216 | A1* | 5/2012 | Knisel ...................... | B41N 1/12 101/401.1 |

FOREIGN PATENT DOCUMENTS

| | | | | |
|---|---|---|---|---|
| DE | WO 2010121887 A1 * | 10/2010 | .............. | B41N 1/12 |
| WO | WO 2013/058906 | 4/2013 | | |

OTHER PUBLICATIONS

Akzo Nobel: "Crosslinking elastomers and thermoplastics: Organic peroxides and auxiliaries", Internt Citation, 2011, pp. 1-15, Retrieved on Mar. 17, 2015.*

O. Melamed, et al., "Laser-Imageable Flexographic Printing Precursors and Methods of Imaging", U.S. Appl. No. 13/173,430, filed Jun. 30, 2011.

M. Amiel-Levy, et al., "Laser-Imageable Flexographic Printing Precursors and Methods of Imaging", U.S. Appl. No. 13/304,974, filed Nov. 28, 2011.

* cited by examiner

*Primary Examiner* — Christina Johnson
*Assistant Examiner* — Xue Liu
(74) *Attorney, Agent, or Firm* — J. Lanny Tucker

(57) ABSTRACT

A laser-engraveable composition comprises one or more elastomeric rubbers including at least 10 parts of one or more non-CLCB EPDM elastomeric rubbers, based on parts per hundred of the total weight of elastomeric rubbers (phr). The laser-engraveable composition further comprises 2-30 phr of a near-infrared radiation absorber and optionally 1-80 phr of an inorganic, non-infrared radiation absorber filler, as well as a vulcanizing composition that comprises a mixture of at least two peroxides. A first peroxide has a $t_{90}$ value of 1-6 minutes as measured at 160° C., and a second peroxide has a $t_{90}$ value of 8-40 minutes as measured at 160° C. This laser-engraveable composition can be used to form a laser-engraveable layer and to form various flexographic printing precursors.

15 Claims, No Drawings

LASER-IMAGEABLE FLEXOGRAPHIC PRINTING PRECURSORS AND METHODS OF IMAGING

FIELD OF THE INVENTION

This invention relates to laser-imageable (laser-engraveable) flexographic printing precursors comprising a unique laser-engraveable layer composition. This invention also relates to methods of imaging these flexographic printing precursors to provide flexographic printing members in printing plate, printing cylinder, or printing sleeve form.

BACKGROUND OF THE INVENTION

Flexography is a method of printing that is commonly used for high-volume printing runs. It is usually employed for printing on a variety of soft or easily deformed materials including but not limited to, paper, paperboard stock, corrugated board, polymeric films, fabrics, metal foils, and laminates. Coarse surfaces and stretchable polymeric films are economically printed using flexography.

Flexographic printing members are sometimes known as "relief" printing members (for example, relief-containing printing plates, printing sleeves, or printing cylinders) and are provided with raised relief images onto which ink is applied for application to a printable material. While the raised relief images are inked, the relief "floor" should remain free of ink. The flexographic printing precursors are generally supplied with one or more imageable layers that can be disposed over a backing layer or substrate. Flexographic printing also can be carried out using a flexographic printing cylinder or seamless sleeve having the desired relief image. These flexographic printing members can be provided from flexographic printing precursors that can be "imaged in-the-round" (ITR) using either a photomask or laser-ablatable mask (LAM) over a photosensitive composition (layer), or they can be imaged by direct laser engraving (DLE) of a laser-engraveable composition (layer) that is not necessarily photosensitive.

Flexographic printing precursors having laser-ablatable layers are described for example in U.S. Pat. No. 5,719,009 (Fan), which precursors include a laser-ablatable mask layer over one or more photosensitive layers. This publication teaches the use of a developer to remove unreacted material from the photosensitive layer, the barrier layer, and non-ablated portions of the mask layer.

There has been a desire in the industry for a way to prepare flexographic printing members without the use of photosensitive layers that are cured using UV or actinic radiation and that require liquid processing to remove non-imaged composition and mask layers. Direct laser engraving of precursors to produce relief printing plates and stamps is known, but the need for relief image depths greater than 500 μm creates a considerable challenge when imaging speed is also an important commercial requirement. In contrast to laser ablation of mask layers that require low to moderate energy lasers and fluence, direct engraving of a relief-forming layer requires much higher energy and fluence. A laser-engraveable layer must also exhibit appropriate physical and chemical properties to achieve "clean" and rapid laser engraving (high sensitivity) so that the resulting printed images have excellent resolution and durability.

A number of elastomeric systems have been described for construction of laser-engravable flexographic printing precursors. For example, U.S. Pat. No. 6,223,655 (Shanbaum et al.) describes the use of a mixture of epoxidized natural rubber and natural rubber in a laser-engraveable composition. Engraving of a rubber is also described by S. E. Nielsen in *Polymer Testing* 3 (1983) pp. 303-310.

U.S. Pat. No. 4,934,267 (Hashimito) describes the use of a natural or synthetic rubber, or mixtures of both, such as acrylonitrile-butadiene, styrene-butadiene and chloroprene rubbers, on a textile support. "Laser Engraving of Rubbers—The Influence of Fillers" by W. Kern et al., October 1997, pp. 710-715 (Rohstoffe Und Anwendendunghen) describes the use of natural rubber, nitrile rubber (NBR), ethylene-propylene-diene terpolymer (EPDM), and styrene-butadiene copolymer (SBR) for laser engraving.

EP 1,228,864A1 (Houstra) describes liquid photopolymer mixtures that are designed for UV imaging and curing, and the resulting printing plate precursors are laser-engraved using carbon dioxide lasers operating at about 10 μm wavelength. Such printing plate precursors are unsuitable for imaging using more desirable near-IR absorbing laser diode systems. U.S. Pat. No. 5,798,202 (Cushner et al.) describes the use of reinforced block copolymers incorporating carbon black in a layer that is UV cured and remains thermoplastic. Such block copolymers are used in many commercial UV-sensitive flexographic printing plate precursors. As pointed out in U.S. Pat. No. 6,935,236 (Hiller et al.), such curing would be defective due to the high absorption of UV as it traverses through the thick imageable layer. Although many polymers are suggested for this use in the literature, only extremely flexible elastomers have been used commercially because flexographic layers that are many millimeters thick must be designed to be bent around a printing cylinder and secured with temporary bonding tape and both must be removable after printing.

U.S. Pat. No. 6,776,095 (Telser et al.) describes elastomers including an EPDM rubber and U.S. Pat. No. 6,913,869 (Leinenbach et al.) describes the use of an EPDM rubber for the production of flexographic printing plates having a flexible metal support. U.S. Pat. No. 7,223,524 (Hiller et al.) describes the use of a natural rubber with highly conductive carbon blacks. U.S. Pat. No. 7,290,487 (Hiller et al.) lists suitable hydrophobic elastomers with inert plasticizers. U.S. Patent Application Publication 2002/0018958 (Nishioki et al.) describes a peelable layer and the use of rubbers such as EPDM and NBR together with inert plasticizers such as mineral oils. The use of inert plasticizers or mineral oils can present a problem as they leach out either during precursor grinding (during manufacture) or storage, or under pressure and contact with ink during printing.

An increased need for higher quality flexographic printing precursors for laser engraving has highlighted the need to solve performance problems that were of less importance when quality demands were less stringent. However, it has been especially difficult to simultaneously improve the flexographic printing precursor in various properties because a change that can solve one problem can worsen or cause another problem.

For example, the rate of imaging is now an important consideration in laser engraving of flexographic printing precursors. Throughput (rate of imaging multiple precursors) by engraving depends upon printing plate precursor width because each precursor is imaged point by point. Imaging, multi-step processing, and drying of UV-sensitive precursors is time consuming but this process is independent of printing plate size, and for the production of multiple flexographic printing plates, it can be relatively fast because many flexographic printing plates can be passed through the multiple stages at the same time.

In contrast, throughput using laser-engraving is somewhat determined by the equipment that is used, but if this is the means for improving imaging speed, the cost becomes the main concern. Improved imaging speed is thus related to equipment cost. There is a limit to what the market will bear in equipment cost in order to have faster imaging. Therefore, much work has been done to try to improve the sensitivity of the flexographic printing plate precursors by various means. For instance, U.S. Pat. No. 6,159,659 (Gelbart) describes the use of a foam layer for laser engraving so that there is less material to ablate. U.S. Pat. No. 6,806,018 (Kanga) uses expandable microspheres to increase precursor sensitivity.

U.S. Patent Application Publication 2009/0214983 (Figov et al.) describes the use of additives that thermally degrade during imaging to produce gaseous products. U.S. Patent Application Publication 2008/0194762 (Sugasaki) suggests that good imaging sensitivity can be achieved using a polymer with a nitrogen atom-containing hetero ring. U.S. Patent Application Publication 2008/0258344 (Regan et al.) describes laser-ablatable flexographic printing precursors that can be degraded to simple molecules that are easily removed.

U.S. Patent Application Publication 2011/0274845 (Melamed et al.) describes flexographic printing precursors having laser-engraveable layers that include mixtures of high and low molecular weight EPDM rubbers, which mixtures provide improvements in performance and manufacturability.

As flexographic imaging (sensitivity) is improved, the need for print quality and consistency increases. In addition, there is a need to make manufacturing as consistent as possible. Laser-engraveable compositions to be compounded tend to have relatively high viscosity, presenting challenges in ensuring excellent mixing of the essential components. This problem is addressed with the invention described in U.S. Patent Application Publication 2011/0274845(noted above) by incorporating a low viscosity EPDM rubber into the composition. Compression recovery can then be a challenge because a good compression rate and printability are generally associated with high molecular weight elastomers in relatively high viscosity compositions.

An important advance in the art is described in copending and commonly assigned U.S. Ser. No. 13/173,430 (filed Jun. 30, 2011 by Melamed, Gal, and Amiel-Levy). Near-IR laser-engraveable compositions and flexographic printing precursors comprise CLCB EPDM elastomeric rubbers with mixtures of peroxides for vulcanizing.

However, there continues to be a need to improve both the sensitivity and manufacturability of laser-engraveable flexographic printing precursors using laser-engraveable compositions containing no CLCB EPDM elastomeric rubbers, having a suitable viscosity and compression recovery. It would be particularly useful to achieve these advantages using near-IR laser-engraving because of the advantages associated with the use of near-IR lasers compared to engraving using carbon dioxide lasers.

SUMMARY OF THE INVENTION

The present invention provides a flexographic printing precursor that is laser-engraveable to provide a relief image, the flexographic printing precursor comprising a laser-engraveable layer being prepared from a laser-engraveable composition comprising one or more EPDM elastomeric rubbers in an amount of at least 30 weight % and up to and including 80 weight %, based on the total laser-engraveable composition weight, the laser-engraveable composition being essentially free of CLCB EPDM elastomeric rubbers, the laser-engraveable composition further comprising at least 2 phr and up to and including 90 phr of a near-infrared radiation absorber, and at least 3 phr and up to and including 20 phr of a vulcanizing composition that comprises a mixture of at least first and second peroxides, the vulcanizing composition being essentially free of sulfur vulcanizing compounds, wherein the first peroxide has a $t_{90}$ value of at least 1 minute and up to and including 6 minutes as measured at 160° C., and the second peroxide has a $t_{90}$ value of at least 8 minutes and up to and including 40 minutes as measured at 160° C., and wherein the weight ratio of the near-infrared radiation absorber to the vulcanizing composition is from 1:10 to and including 10:1.

This invention also provides a method for providing a flexographic printing member comprising:

imaging the laser-engraveable layer of the flexographic printing precursor described herein (for example as described above) using near-infrared radiation to provide a flexographic printing member with a relief image in the resulting laser-engraved layer.

In some embodiments, a method for preparing the flexographic printing precursor described herein for this invention comprises:

providing a laser-engraveable composition comprising one or more EPDM elastomeric rubbers in an amount of at least 30 weight % and up to and including 80 weight %, based on the total dry laser-engraveable composition weight, the laser-engraveable composition being essentially free of CLCB EPDM elastomeric rubbers, the laser-engraveable composition further comprising at least 2 phr and up to and including 30 phr of a near-infrared radiation absorber, and at least 3 phr and up to and including 20 phr of a vulcanizing composition that comprises a mixture of at least first and second peroxides, the vulcanizing composition being essentially free of sulfur vulcanizing compounds, wherein the first peroxide has a $t_{90}$ value of at least 1 minute and up to and including 6 minutes as measured at 160° C., and the second peroxide has a $t_{90}$ value of at least 8 minutes and up to and including 40 minutes as measured at 160° C., and wherein the weight ratio of the near-infrared radiation absorber to the vulcanizing composition is from 1:10 to and including 10:1, to form a laser-engraveable layer.

It has been found with the present invention that good crosslinking density and layer hardness of non-CLCB EPDM elastomeric resins can be achieved using a vulcanizing composition comprising a mixture of at least first and second peroxides, wherein the first peroxide has a $t_{90}$ value of at least 1 minute and up to and including 6 minutes as measured at 160° C., and the second peroxide has a $t_{90}$ value of at least 8 minutes and up to and including 40 minutes as measured at 160° C. In addition, the present invention provides a laser-engraveable composition having lower composition viscosity, and thus providing flexographic printing precursors that have excellent hardness, elongation, compressibility and printability.

Moreover, addition of a compressible layer to some embodiments of the flexographic printing precursor influences the printing performances (good quality of solids and good dot reproduction) that are improved even if it is laser-engraving is performed at high speed. The presence of the compressible layer can provide accurate and precise positioning of the flexographic printing precursor because the variable tolerances caused by using a compressible adhesive layer are not present.

The laser-engraveable compositions are particularly useful with laser engraving methods using near-infrared radiation sources that have numerous advantages over carbon dioxide lasers such as providing higher resolution images and reduced energy consumption.

DETAILED DESCRIPTION OF THE INVENTION

Definitions

As used herein to define various components of the laser-engraveable compositions, formulations, and layers, unless otherwise indicated, the singular forms "a", "an", and "the" are intended to include one or more of the components (that is, including plurality referents).

Each term that is not explicitly defined in the present application is to be understood to have a meaning that is commonly accepted by those skilled in the art. If the construction of a term would render it meaningless or essentially meaningless in its context, the term's definition should be taken from a standard dictionary.

The use of numerical values in the various ranges specified herein, unless otherwise expressly indicated otherwise, are considered to be approximations as though the minimum and maximum values within the stated ranges were both preceded by the word "about". In this manner, slight variations above and below the stated ranges can be used to achieve substantially the same results as the values within the ranges. In addition, the disclosure of these ranges is intended as a continuous range including every value between the minimum and maximum values.

The term "imaging" refers to ablation of the background areas while leaving intact the areas of the flexographic printing precursor that will be inked up and printed using a flexographic ink.

The term "flexographic printing precursor" refers to a non-imaged flexographic element of this invention. The flexographic printing precursors include flexographic printing plate precursors, flexographic printing sleeve precursors, and flexographic printing cylinder precursors, all of which can be laser-engraved to provide a relief image using a laser according to the present invention to have a dry relief depth of at least 50 μm and up to and including 4,000 μm. Such laser-engraveable, relief-forming precursors can also be known as "flexographic printing plate blanks", "flexographic printing cylinders", or "flexographic sleeve blanks". The laser-engraveable flexographic printing precursors can also have seamless or continuous forms.

The term "laser-engraveable" means that the laser-engraveable (or imageable) layer can be imaged using a suitable laser-engraving source including infrared radiation lasers, for example carbon dioxide lasers and near-infrared radiation lasers such as Nd:YAG lasers, laser diodes, and fiber lasers. Absorption of energy from these lasers produces heat within the laser-engraveable layer that causes rapid local changes in the laser-engraveable layer so that the imaged regions are physically detached from the rest of the layer or substrate and ejected from the layer and collected using suitable means. Non-imaged regions of the laser-engraveable layer are not removed or volatilized to an appreciable extent and thus form the upper surface of the relief image that is the flexographic printing surface. The breakdown is a violent process that includes eruptions, explosions, tearing, decomposition, fragmentation, oxidation, or other destructive processes that create a broad collection of solid debris and gases. This is distinguishable from, for example, image transfer. "Laser-ablative" and "laser-engraveable" can be used interchangeably in the art, but for purposes of this invention, the term "laser-engraveable" is used to define the imaging according to the present invention in which a relief image is formed in the laser-engraveable layer. It is distinguishable from image transfer methods in which ablation is used to materially transfer pigments, colorants, or other image-forming components. The present invention is also distinguished from laser ablation of a thin layer to create a mask that is used to control the application of curing radiation when it is used to make a flexographic or lithographic printing plate.

Unless otherwise indicated, the term "weight %" refers to the amount of a component or material based on the total dry layer weight of the composition or layer in which it is located.

Unless otherwise indicated, the terms "laser-engraveable composition" and "laser-engravable layer formulation" are intended to be the same.

The term "phr" denotes the relationship between a compound or component in the laser-engraveable layer and the total elastomeric rubber dry weight in that layer and refers to "parts per hundred rubber".

The "top surface" is equivalent to the "relief-image forming surface" and is defined as the outermost surface of the laser-engraveable layer and is the first surface of that layer that is struck by imaging (ablating) radiation during the engraving or imaging process. The "bottom surface" is defined as the surface of the laser-engraveable that is most distant from the imaging radiation.

The term "elastomeric rubber" refers to rubbery materials that generally regain their original shape when stretched or compressed.

The term "non-CLCB EPDM elastomeric rubber" refers to EPDM elastomeric rubbers that do not purposely have controlled long chain branching. More details of these materials are provided below. The term "EPDM" is known in the art to refer to an ethylene-propylene-diene terpolymer elastomeric rubber.

Delta torque, Δ torque ($M_{\Delta}=M_H-M_L$) is defined as equal to the difference between the measure of the elastic stiffness of the vulcanized test specimen at a specified vulcanizing temperature measured within a specific period of time ($M_H$) and the measure of the elastic stiffness of the non-vulcanized test specimen at the same specified vulcanizing temperature taken at the lower point in the vulcanizing curve ($M_L$), according to ASTM D-5289.

A $t_{90}$ value is known as the time required for a given compound to reach 90% of the ultimate state of cure (theoretical cure) at a given temperature.

Flexographic Printing Precursors

The flexographic printing precursors of this invention are laser-engraveable to provide a desired relief image, and comprise at least one laser-engraveable layer that is formed from a laser-engraveable composition that comprises one or more non-CLCB EDPM elastomeric rubbers in a total amount of generally at least 30 weight % and up to and including 80 weight %, and more typically at least 40 weight % and up to and including 70 weight %, based on the total dry laser-engraveable composition.

Of the total elastomeric rubbers, the laser-engraveable composition comprises at least 10 parts (phr) and up to and including 100 parts (phr), and typically at least 30 parts (phr) and up to and including 80 parts (phr), of one or more non-CLCB EPDM elastomeric rubbers, based on the parts per hundred of the total weight of elastomeric rubbers (phr). There are no CLCB EPDM elastomeric rubbers purposely added to the laser-engraveable composition, and if such elastomeric rubbers are present, it is at less than 5 phr. In addition to the non-CLCB EPDM elastomeric rubbers, the laser-engraveable composition or layer can comprise one or more resins that are not EPDM elastomeric rubbers (secondary resins described below).

CLCB EPDM elastomeric rubbers are EPDM elastomeric rubbers that have controlled long-chain branching attached to the EPDM backbone. The molecular weight distribution for these polymers are considered to be narrow and have improved physical properties over EPDM elastomeric rubbers having a broader molecular weight distribution. Some details of such EPDM elastomeric rubbers are also provided in a paper presented by Odenhamn to the RubberTech China Conference 1998.

The non-CLCB EPDM elastomeric rubbers are the most essential components of the laser-engraveable compositions and flexographic printing precursors of this invention, along with the mixture of peroxides defined below. Some flexographic printing precursors comprise a laser-engraveable layer that have laser-engraveable compositions that consist essentially of one or more non-CLCB EPDM elastomeric rubbers along with optional non-EPDM resins, while still other flexographic printing precursors comprise a laser-engraveable layer that consists only of one or more non-CLCB EPDM elastomeric rubbers as the only resins in the layer.

For example, one or more “high molecular weight” non-CLCB EPDM elastomeric rubbers can be incorporated in the laser-engraveable composition, and these compounds can be obtained from a number of commercial sources as the following products: Keltan® EPDM (from DSM Elastomers), Royalene® EPDM (from Lion Copolymers), Kep® (from Kumho Polychem), Nordel (from DuPont Dow Elastomers). Such high molecular weight non-CLCB EPDM elastomeric rubbers generally have a number average molecular weight of at least 20,000 and up to and including 800,000 and typically of at least 200,000 and up to and including 800,000, and more typically of at least 250,000 and up to and including 500,000.

In addition to the high molecular weight non-CLCB EPDM elastomeric rubber, the laser-engraveable composition or layer can further comprise one or more “low molecular weight” non-CLCB EPDM elastomeric rubbers that are generally in liquid form and have a number average molecular weight of at least 2,000 and up to but less than 20,000, and typically of at least 2,000 and up to and including 10,000, and more typically of at least 2,000 and up to and including 8,000. Such low molecular weight non-CLCB EPDM elastomeric rubbers can also be obtained from various commercial sources, for example as Trilene® EPDM (from Lion Copolymers). When present, the low molecular weight non-CLCB EPDM elastomeric rubbers are generally present in the laser-engraveable layer in an amount of at least 5 phr and up to and including 50 phr, or typically in an amount of at least 15 phr and up to and including 35 phr.

In some embodiments of this invention, the laser-engraveable composition or layer comprises: (a) at least one high molecular weight non-CLCB EPDM elastomeric rubber that has a molecular weight of at least 20,000, (b) at least one low molecular weight non-CLCB EPDM elastomeric rubber that has a molecular weight of at least 2,000 and less than 20,000, or (c) a mixture of one or more high molecular weight non-CLCB EPDM elastomeric rubbers each having a molecular weight of at least 20,000 and one or more of the low molecular weight non-CLCB EPDM elastomeric rubbers having a molecular weight of at least 2,000 and less than 20,000, at a weight ratio of high molecule weight non-CLCB EPDM elastomeric rubber to the low molecular weight non-CLCB EPDM elastomeric rubber of from 1:2.5 to and including 16:1, or typically from 1:1 to and including 4:1.

Still other non-CLCB EPDM elastomeric rubbers can be useful in the laser-engraveable composition or layer, which non-CLCB EPDM elastomeric rubbers can be considered as semi-crystalline or crystalline, the latter of which were found to be particularly useful when they have a number average molecular weight of at least 15,000 and up to and including 25,000. These non-CLCB EPDM elastomeric rubbers can be in solid, semi-solid, or liquid form and can have different amounts of ethylene groups.

The laser-engraveable composition can optionally include minor amounts (less than 40 phr) of “secondary” resins that are non-EPDM elastomeric rubbers, for example to provide layer structure or reinforcement. These optional resins can include but are not limited to, thermosetting or thermoplastic urethane resins that are derived from the reaction of a polyol (such as polymeric diol or triol) with a polyisocyanate or the reaction of a polyamine with a polyisocyanate, copolymers of styrene and butadiene, copolymers of isoprene and styrene, styrene-butadiene-styrene block copolymers, styrene-isoprene-styrene copolymers, other polybutadiene or polyisoprene elastomers, nitrile elastomers, polychloroprene, polyisobutylene and other butyl elastomers, any elastomers containing chlorosulfonated polyethylene, polysulfide, polyalkylene oxides, or polyphosphazenes, elastomeric polymers of (meth)acrylates, elastomeric polyesters, and other similar polymers known in the art.

Still other useful secondary non-EPDM resins include vulcanized rubbers, such as Nitrile (Buna-N), Natural rubber, Neoprene or chloroprene rubber, silicone rubber, fluorocarbon rubber, fluorosilicone rubber, SBR (styrene-butadiene rubber), NBR (acrylonitrile-butadiene rubber), ethylene-propylene rubber, and butyl rubber. Other useful secondary non-EPDM resins include but are not limited to, poly(cyanoacrylate)s that include recurring units derived from at least one alkyl-2-cyanoacrylate monomer and that forms such monomer as the predominant low molecular weight product during laser-engraving. These polymers can be homopolymers of a single cyanoacrylate monomer or copolymers derived from one or more different cyanoacrylate monomers, and optionally other ethylenically unsaturated polymerizable monomers such as (meth)acrylate, (meth)acrylamides, vinyl ethers, butadienes, (meth)acrylic acid, vinyl pyridine, vinyl phosphonic acid, vinyl sulfonic acid, and styrene and styrene derivatives (such as α-methylstyrene), as long as the non-cyanoacrylate comonomers do not inhibit the ablation process. The monomers used to provide these polymers can be alkyl cyanoacrylates, alkoxy cyanoacrylates, and alkoxyalkyl cyanoacrylates. Representative examples of poly(cyanoacrylates) include but are not limited to poly(alkyl cyanoacrylates) and poly(alkoxyalkyl cyanoacrylates) such as poly(methyl-2-cyanoacrylate), poly(ethyl-2-cyanoacrylate), poly(methoxyethyl-2-cyanoacrylate), poly(ethoxyethyl-2-cyanoacylate), poly(methyl-2-cyanoacrylate-co-ethyl-2-cyanoacrylate), and other polymers described in U.S. Pat. No. 5,998,088 (Robello et al.) that is incorporated herein by reference.

Yet other secondary non-EPDM resins are alkyl-substituted polycarbonate or polycarbonate block copolymers that form a cyclic alkylene carbonate as the predominant low molecular weight product during depolymerization from ablation. The polycarbonates can be amorphous or crystalline as described for example in Cols. 9-12 of U.S. Pat. No. 5,156,938 (Foley et al.) that is incorporated herein by reference.

It is possible to introduce a mineral oil into the laser-engraveable composition or layer formulation. One or more mineral oils can be present in an amount of at least 5 phr and up to and including 50 phr, but the mineral oil can be omitted if one or more low molecular weight non-CLCB EPDM elastomeric rubbers are present in an amount of at least 5 phr and up to and including 40 phr.

In most embodiments, the laser-engraveable composition comprises one or more near-infrared radiation absorbers that facilitate or enhance laser engraving to form a relief image. The near-infrared radiation absorbers have maximum absorption at a wavelength of at least 700 nm and at greater wavelengths in what is known as the near-infrared and infrared portion of the electromagnetic spectrum. In particularly useful embodiments, the radiation absorber is a near-infrared radiation absorber having a $\lambda_{max}$ in the near-infrared portion of the electromagnetic spectrum, that is, having a $\lambda_{max}$ of at least 700 nm and up to and including 1400 nm or at least 750 nm and up to and including 1250 nm, or more typically of at least 800 nm and up to and including 1250 nm. If multiple engraving means having different engraving wavelengths are used, multiple near-infrared radiation absorbers can be used.

Particularly useful near-infrared radiation absorbers are responsive to exposure from near-infrared lasers. Mixtures of the same or different types of near-infrared radiation absorbers can be used if desired. A wide range of useful near-infrared radiation absorbers include but are not limited to, carbon blacks and other near-infrared radiation absorbing organic or inorganic pigments (including squarylium, cyanine, merocyanine, indolizine, pyrylium, metal phthalocyanines, and metal dithiolene pigments), and metal oxides.

Examples of useful carbon blacks include RAVEN® 450, RAVEN® 760 ULTRA®, RAVEN® 890, RAVEN® 1020, RAVEN® 1250 and others that are available from Columbian Chemicals Co. (Atlanta, Ga.) as well as N 293, N 330, N 375, and N 772 that are available from Evonik Industries AG (Switzerland) and Mogul® L, Mogul® E, Emperor 2000, and Regal® 330, and 400, that are available from Cabot Corporation (Boston Mass.). Both non-conductive and conductive carbon blacks (described below) are useful. Some conductive carbon blacks have a high surface area and a dibutyl phthalate (DBP) absorption value as described for example in U.S. Pat. No. 7,223,524 (Hiller et al.) that is incorporated herein by reference. Carbon blacks can be acidic or basic in nature. Useful conductive carbon blacks also can be obtained commercially as Ensaco™ 150 P (from Timcal Graphite and Carbon), Hi Black 160 B (from Korean Carbon Black Co. Ltd.), and also include those described in U.S. Pat. No. 7,223,524 (noted above, Col. 4, lines 60-62) that is incorporated herein by reference. Useful carbon blacks also include those that are surface-functionalized with solubilizing groups, and carbon blacks that are grafted to hydrophilic, nonionic polymers, such as FX-GE-003 (manufactured by Nippon Shokubai).

Other useful near-infrared radiation absorbing pigments include, but are not limited to, Heliogen Green, Nigrosine Base, iron (III) oxides, transparent iron oxides, magnetic pigments, manganese oxide, Prussian Blue, and Paris Blue. Other useful near-infrared radiation absorbers include carbon nanotubes, such as single- and multi-walled carbon nanotubes, graphite (including porous graphite), graphene, and carbon fibers.

A fine dispersion of very small particles of pigmented near-infrared radiation absorbers can provide an optimum laser-engraving resolution and ablation efficiency. Suitable pigment particles are those with diameters less than 1 μm.

Dispersants and surface functional ligands can be used to improve the quality of the carbon black, metal oxide, or pigment dispersion so that the near-infrared radiation absorber is uniformly incorporated throughout the laser-engraveable layer.

In general, one or more near-infrared radiation absorbers, are present in the laser-engraveable composition in a total amount of at least total amount of at least 2 phr and up to and including 90 phr and typically from at least 3 phr and up to and including 30 phr. Alternatively, the near-infrared radiation absorber includes one or more conductive or non-conductive carbon blacks, graphene, graphite, carbon fibers, or carbon nanotubes, and especially carbon nanotubes, carbon fibers, or a conductive carbon black having a dibutyl phthalate (DBP) absorption value of less than 110 ml/100 g, in an amount of at least 3 phr, or at least 5 phr and up to and including 30 phr.

It is also possible that the near-infrared radiation absorber (such as a carbon black) is not dispersed uniformly within the laser-engraveable layer, but it is present in a concentration that is greater near the bottom surface of the laser-engraveable layer than the top surface. This concentration profile can provide a laser energy absorption profile as the depth into the laser-engraveable layer increases. In some instances, the concentration changes continuously and generally uniformly with depth. In other instances, the concentration is varied with layer depth in a step-wise manner. Further details of such arrangements of the near-IR radiation absorbing compound are provided in U.S. Patent Application Publication 2011/0089609 (Landry-Coltrain et al.) that is incorporated herein by reference.

In some particularly useful embodiments, the laser-engraveable composition comprises component a) described above that comprises at least 2 phr and up to and including 30 phr, and typically at least 3 phr and up to and including 30 phr, of one or more near-infrared radiation absorbers (such as a carbon black, carbon nanotubes, carbon fibers, graphite, or graphite), and at least 1 phr and up to and including 80 phr, and typically at least 1 phr and up to and up to and including 60 phr, of one or more non-infrared radiation absorber fillers. While polymeric (organic) non-infrared radiation absorber fillers are possible, it is more likely that the non-infrared radiation absorber fillers are predominantly or all inorganic in nature.

Useful inorganic non-infrared radiation absorber fillers include but not limited to, various silicas (treated, fumed, or untreated), calcium carbonate, magnesium oxide, talc, barium sulfate, kaolin, bentonite, zinc oxide, mica, titanium dioxide, and mixtures thereof. Particularly useful inorganic non-infrared radiation absorbing fillers are silica, calcium carbonate, and alumina, such as fine particulate silica, fumed silica, porous silica, surface treated silica, sold as Aerosil® from Degussa, Utrasil® from Evonik, and Cab-O-Sil® from Cabot Corporation, micropowders such as amorphous magnesium silicate cosmetic microspheres sold by Cabot and 3M Corporation, calcium carbonate and barium sulfate particles and microparticles, zinc oxide, and titanium dioxide, or mixtures of two or more of these materials.

The amount of the non-infrared radiation absorber fillers in the laser-engraveable composition is generally at least 1 phr and up to and including 80 phr, or typically at least 1 phr and up to and including 60 phr. Coupling agents can be added for connection between fillers and all of the polymers in the laser-engraveable layer. An example of a coupling agent is silane (Dynsylan 6498 or Si 69 available from Evonik Degussa Corporation).

When the near-infrared radiation absorber, such as a carbon black, is used with the inorganic non-infrared radiation absorber filler as described for component a), the weight ratio of the near-infrared radiation absorber to the non-infrared radiation absorber filler is from 1:40 to and including 30:1 or typically from 1:30 to and including 20:1, or more typically from 1:20 to and including 10:1. When these weight ratios are used, the result is a laser-engraveable layer hardness that provides excellent printing quality, low compression set that provides a resistance to changes in the flexographic printing member after impact during each printing impression, and improved imaging speed.

In some embodiments, the flexographic printing precursor comprises a laser-engraveable composition comprising one or more non-infrared radiation absorber fillers, a near-infrared radiation absorber (such as a carbon black), and a mixture one or more non-CLCB EPDM elastomeric rubbers in an amount of at least 15 phr and up to and including 70 phr.

Still other embodiments of this invention include flexographic printing precursors that comprise a laser-engraveable layer formed from a laser-engraveable composition comprising:

at least 1 phr and up to and including 80 phr of one or more non-infrared radiation absorbing fillers and at least 2 phr and up to and including 30 phr of a carbon black, wherein the weight ratio of the carbon black to one or more non-infrared radiation absorber fillers is from at least 1:40 and up to and including 30:1, and the laser-engraveable composition further comprises a mixture one or more non-CLCB EPDM elastomeric rubbers and one or more non-EPDM resins, wherein the weight ratio of one or more non-CLCB EPDM elastomeric rubbers to the one or more non-EPDM resins is from 1:3 to and including 5:1.

Some useful embodiments of laser-engraveable compositions and layers comprise a conductive or non-conductive carbon black, carbon fibers, or carbon nanotubes as the near-infrared radiation absorber, and silica, calcium carbonate, or both silica and calcium carbonate particles as non-infrared radiation absorber filler.

The laser-engraveable composition includes at least 2 phr and up to and including 30 phr or typically at least 2 phr and up to and including 20 phr of a near-infrared radiation absorber, and at least 3 phr and up to and including 20 phr, or typically at least 7 phr and up to and including 12 phr, of a vulcanizing composition that comprises a mixture of peroxides as described below, wherein the weight ratio of the near-infrared radiation absorber to the vulcanizing composition is from 1:10 to and including 10:1.

The vulcanizing composition (or crosslinking composition) can crosslink the non-CLCB EPDM elastomeric rubbers and any other resin in the laser-engraveable composition that can benefit from crosslinking. The vulcanizing composition, including all of its essential components, is generally present in the laser-engraveable composition in an amount of at least 3 phr and up to and including 20 phr, or typically of at least 7 phr and up to and including 12 phr.

Useful vulcanizing compositions are peroxide vulcanizing compositions that consist essentially of two or more peroxides including but not limited to, di(t-butylperoxyisopropyl)benzene, 2,5-dimethyl-2,5 bis(t-butyl)peroxy) hexane, dicumyl peroxide, di(t-butyl)peroxide, butyl 4,4'-di (t-butylperoxy)valerate, 1,1'-bis(t-butylperoxy)-3,3,5-trimethylcyclohexane, t-butyl cumyl peroxide, t-butyl peroxybenzoate, t-butyl peroxy-2-ethylhexyl carbonate, and any others that can react with single carbon-carbon bonds and thus produce a higher curing density. The term "peroxide" also includes "hydroperoxides". Many commercially available peroxides are supplied at 40-50% activity with the remainder of the commercial composition being inert silica or calcium carbonate particles. The peroxide vulcanizing compositions generally also comprise one or more co-reagents at a molar ratio to the total peroxides of from 1:6 to and including 25:1. The vulcanizing compositions contain essentially no other vulcanizing compounds such as sulfur compounds (less than 5 phr of sulfur compounds).

Useful co-reagents include but are not limited to, triallyl cyanurate (TAC), triallyl isocyanurate, triallyl trimellitate, the esters of acrylic and methacrylic acids with polyvalent alcohols, trimethylpropane trimethacrylate (TMPTMA), trimethylolpropane triacrylate (TMPTA), ethylene glycol dimethacrylate (EGDMA), and N,N'-m-phenylenedimaleimide (HVA-2, DuPont) to enhance the liberation of free radicals from the peroxides. Some useful peroxide compositions consist essentially of two or more peroxides, and particularly mixtures of first and second peroxides described below, and one or more co-reagents. Other useful peroxides and co-reagents (such as Type I and Type II compounds) are well known in the art.

It is useful to use a mixture of at least first and second peroxides in a peroxide vulcanizing composition, wherein the first peroxide has a $t_{90}$ value of at least 1 minute and up to and including 6 minutes, typically at least 2 minutes and up to and including 6 minutes, as measured at 160° C., and the second peroxide has a $t_{90}$ value of at least 8 minutes and up to and including 40 minutes, or typically at least 16 minutes and up to and including 40 minutes, as measured at 160° C. Useful examples of the first peroxides include but are not limited to, t-butyl peroxybenzoate, 1,1'-bis(t-butylperoxy)-3,3,5-trimethylcyclohexane, t-butylperoxy 2-ethylhexyl carbonate, and butyl 4,4'-di (t-butylperoxy)valerate. Useful examples of the second peroxides include but are not limited to, di(t-butylperoxyisopropyl)benzene, dicumyl peroxide, t-butyl cumyl peroxide, and 2,5-dimethyl-2,5 bis(t-butyl)peroxy)hexane. Other representative first and second peroxides could be easily determined by consulting known information about the $t_{90}$ values for various peroxides.

The molar ratio of the first peroxide to the second peroxide is generally at least 1:40 and to and including 1:1.33, or typically at least 1:20 and to and including 1:2.67. These ranges or peroxide molar ratios can be used with any or all combinations of the other features and components used in the practice of this invention.

These mixtures of first and second peroxides can also comprise one or more co-reagents as described above. In some embodiments, useful peroxide vulcanizing compositions consist essentially of: (1) one or more first peroxides, (2) one or more second peroxides, and (3) one or more co-reagents.

The mixtures comprising at least one first peroxide and at least one second peroxide can further comprise additional peroxides as long as the laser-engraveable composition has the desired characteristics described herein. For example, it is particularly useful that the laser-engraveable composition exhibit a $t_{90}$ value of at least 1 minute and up to and including 17 minutes at 160° C.

In many embodiments of this invention, the laser-engraveable composition comprises the mixture of first and second peroxides described above and the near-infrared radiation absorber is a carbon black (conductive or non-conductive). The near-infrared radiation absorber can also be a conductive or non-conductive carbon black wherein the weight ratio of the carbon black to the mixture of at least first and second peroxides is from 1:17 to and including 10:1. These weight ratios do not include the co-reagents that are also likely to be present in the peroxide vulcanizing composition.

The laser-engraveable composition or layer can further comprise microcapsules that are dispersed generally uniformly within the laser-engraveable composition. These "microcapsules" can also be known as "hollow beads", "hollow spheres", "microspheres", microbubbles", "micro-balloons", "porous beads", or "porous particles". Some microcapsules include a thermoplastic polymeric outer shell and a core of either air or a volatile liquid such as isopentane or isobutane. The microcapsules can comprise a single center core or many voids (pores) within the core. The voids can be interconnected or non-connected. For example, non-laser-ablatable microcapsules can be designed like those described in U.S. Pat. Nos. 4,060,032 (Evans) and 6,989,220 (Kanga) in which the shell is composed of a poly[vinylidene-(meth)acrylonitrile] resin or poly(vinylidene chloride), or as plastic micro-balloons as described for example in U.S. Pat. Nos. 6,090,529 (Gelbart) and 6,159,659 (Gelbart), all of which publications are incorporated herein by reference. The amount of microspheres present in the laser-engraveable composition or layer can be at least 1 phr and up to and including 15 phr. Some useful microcapsules are the EXPANCEL® microspheres that are commercially available from Akzo Noble Industries (Duluth, Ga.), Dualite and Micropearl polymeric microspheres that are available from Pierce & Stevens Corporation (Buffalo, N.Y.), hollow plastic pigments that are available from Dow Chemical Company (Midland, Mich.) and Rohm and Haas (Philadelphia, Pa.). The useful microcapsules generally have a diameter of 50 μm or less.

Upon laser-engraving, the microspheres that are hollow or filled with an inert solvent, burst and give a foam-like structure or facilitate ablation of material from the laser-engraveable layer because they reduce the energy needed for ablation.

Optional addenda in the laser-engraveable composition or layer can include but are not limited to, dyes, antioxidants, antiozonants, stabilizers, dispersing aids, surfactants, and adhesion promoters, as long as they do not interfere with laser-engraving efficiency.

The flexographic printing precursor of this invention generally has a laser-engraveable layer having a Δ torque ($M_\Delta = M_H - M_L$) of at least 10 and up to and including 25, or typically of at least 13 and up to and including 22, wherein the components of this equation are defined above.

The laser-engraveable layer incorporated into the flexographic printing precursors of this invention has a dry thickness of at least 50 μm and up to and including 4,000 μm, or typically of at least 200 μm and up to and including 2,000 μm.

While a single laser-engraveable layer is present in most flexographic printing precursors, there can be multiple laser-engraveable layers formed from the same or different laser-engraveable compositions, that is, having the same or different non-CLCB EPDM elastomeric rubbers and amounts as long as the uppermost laser-engraveable layer comprises non-CLCB EPDM elastomeric rubbers of the composition and amounts described above (at least 30 weight % and up to and including 80 weight %).

In most embodiments, the laser-engraveable layer is the outermost layer of the flexographic printing precursors, including embodiments where the laser-engraveable layer is disposed on a printing cylinder as a sleeve. However, in some embodiments, the laser-engraveable layer can be located underneath an outermost capping smoothing layer that provides additional smoothness or better ink reception and release. This smoothing layer can have a general dry thickness of at least 1 μm and up to and including 200 μm.

Compressible Layer:

The flexographic printing precursors of this invention can also comprise an elastomeric rubber layer that is considered a "compressible" layer (also known as a cushioning layer) and can be disposed over a substrate. In many embodiments, the compressible layer is disposed directly on the substrate and the laser-engraveable layer is disposed over the compressible layer. In most embodiments, the laser-engraveable layer is disposed directly on the compressible layer.

While the compressible layer can be non-laser-engraveable, it most embodiments, the compressible layer comprises one or more elastomeric rubbers that also make it laser-engraveable. Any useful elastomeric rubber, or mixture thereof, can be used in the compressible layer, especially if the choice of elastomeric rubber allows for the compressible layer to be laser-engraveable.

In many embodiments, the compressible layer comprises one or more CLCB or non-CLCB elastomeric rubbers, which compounds are described above. The compressible layer and outermost laser-engraveable layer can comprise the same or different non-CLCB elastomeric rubbers.

The compressible layer comprises one or more elastomeric rubbers (such as CLCB or non-CLCB elastomeric rubbers) in an amount of at least 30 weight % and up to and including 80 weight %, based on the total dry weight of the compressible layer, or typically of at least 40 weight % and up to and including 70 weight %.

The compressible layer can also comprise microvoids or microspheres dispersed within the one or more elastomeric rubbers. In most embodiments, the microvoids or microspheres are uniformly dispersed within those elastomeric rubbers. If microvoids are present, they comprise at least 1% and up to and including 15% of the dry compressible layer volume. If microspheres are present, they are present in an amount of at least 2 phr and up to and including 30 phr, or typically at least 5 phr and up to and including 20 phr, wherein in this context, "phr" refers to parts per hundred of the elastomeric rubber(s) present in the compressible layer.

Useful microspheres are described above as "microcapsules", "hollow beads", "hollow spheres", microbubbles", "micro-balloons", "porous beads", or "porous particles", which are dispersed (generally uniformly) within the one or more elastomeric rubbers in the compressible layer. Some microspheres include a thermoplastic polymeric outer shell and a core of either air or a volatile liquid such as isopentane or isobutane. The microspheres can comprise a single center core or many voids (pores) within the core. The voids can be interconnected or non-connected. For example, non-laser-ablatable microspheres can be designed like those described in U.S. Pat. Nos. 4,060,032 (Evans) and 6,989,220 (Kanga) in which the shell is composed of a poly[vinylidene-(meth)acrylonitrile] resin or poly(vinylidene chloride), or as plastic micro-balloons as described for example in U.S. Pat. Nos. 6,090,529 (Gelbart) and 6,159,659 (Gelbart). Some useful microspheres are the EXPANCEL® microspheres that are commercially available from Akzo Noble Industries (Duluth, Ga.), Dualite and Micropearl polymeric microspheres that are available from Pierce & Stevens Corporation (Buffalo, N.Y.), hollow plastic pigments that are available from Dow Chemical Company (Midland, Mich.) and Rohm and Haas (Philadelphia, Pa.), and hollow glass microspheres (for example, iM30K) that are available from 3M Corporation. The useful microspheres generally have a diameter of 50 μm or less.

Microvoids can be created in the compressible layer by the addition of expanded EXPANCEL® microspheres or unexpanded EXPANCEL® microspheres that exposed thermally, or by the addition of blowing agents that decompose thermally to release gases and cause closure of cell structures The compressible layer can also comprise optional addenda such as non-radiation absorber fillers and other addenda described above for the laser-engraveable layer.

The dry thickness of the compressible layer is generally at least 50 μm and up to and including 4,000 μm, or typically at least 100 μm and up to and including 2,000 μm.

In addition, the dry thickness ratio of the compressible layer to the laser-engraveable layer can be from 1:80 to and including 80:1, or typically from 1:20 to and including 20:1.

The flexographic printing precursors of this invention can have a suitable dimensionally stable, non-laser-engraveable substrate having an imaging side and a non-imaging side. The substrate has at least one laser-engraveable layer disposed over the compressible layer on the imaging side of the substrate. Suitable substrates include dimensionally stable polymeric films, aluminum sheets or cylinders, transparent foams, ceramics, fabrics, or laminates of polymeric films (from condensation or addition polymers) and metal sheets such as a laminate of a polyester and aluminum sheet or polyester/polyamide laminates, or a laminate of a polyester film and a compliant or adhesive support. Polyester, polycarbonate, polyvinyl, and polystyrene films are typically used. Useful polyesters include but are not limited to poly (ethylene terephthalate) and poly(ethylene naphthalate). The substrates can have any suitable thickness, but generally they are at least 0.01 mm or at least 0.05 mm and up to and including 0.5 mm thick. An adhesive layer can be used to secure the compressible layer to the substrate.

Some particularly useful substrates comprise one or more layers of a metal, fabric, or polymeric film, or a combination thereof. For example, a fabric web can be applied to a polyester or aluminum support using a suitable adhesive. For example, the fabric web can have a thickness of at least 0.1 mm and up to and including 0.5 mm, and the polyester support thickness can be at least 100 μm and up to and including 200 μm or the aluminum support can have a thickness of at least 200 μm and up to and including 400 μm. The dry adhesive thickness of the substrate can be at least 10 μm and up to and including 80 μm.

There can be a non-laser-engraveable backcoat on the non-imaging side of the substrate that can comprise a soft rubber or foam, or other compliant layer. This non-laser-engraveable backcoat can provide adhesion between the substrate and printing press rollers and can provide extra compliance to the resulting flexographic printing member, or for example to reduce or control the curl of a resulting flexographic printing plate.

Preparation of Flexographic Printing Precursors

The flexographic printing precursors of this invention can be prepared in the following manner:

If a compressible layer is to used, it is disposed on a suitable substrate, such as a continuous roll of a dry laser-engraveable layer on the fabric base, by formulating one or more elastomeric rubbers (such as one or more CLCB or non-CLCB elastomeric rubbers) and suitable microspheres or void-providing agents and forming the mixture into a layer in a manner similar to the formulation of the laser-engraveable layer as described below. If desired, the compressible layer can be formed on a suitable substrate as described below, and the laser-engraveable layer is formed on the compressible layer.

For the laser-engraveable layer, a mixture of one or more EPDM elastomeric rubbers including at least one non-CLCB EPDM elastomeric rubber can be formulated with desired weight ratios. This mixture can also be formulated to include one or more high molecular weight non-CLCB EPDM elastomeric rubbers, one or more low molecular weight non-CLCB EPDM elastomeric rubbers, or both a high molecular weight non-CLCB EPDM elastomeric rubber and a low molecular weight non-CLCB EPDM elastomeric rubbers, all at desired weight amounts (based on phr). Additional components (such as the non-radiation absorber fillers or near-infrared radiation absorbers, but not the vulcanizing compositions) can be added and the resulting mixture is then compounded using standard equipment for rubber processing (for example, a 2-roll mill or internal mixer of the Banbury type). During this mixing process, the temperature of the formulation can rise to 110° C. due to the high shear forces in the mixing apparatus. Mixing (or formulating) generally would require at least 5 and up to and including 30 minutes depending upon the formulation batch size, amount of non-radiation absorber fillers, types and amounts of the various elastomeric rubbers, the amount of any non-elastomeric resins, and other factors known to a skilled artisan.

The vulcanizing composition can then be added to standard equipment and the temperature of the formulation is kept below 70° C. so vulcanizing will not begin prematurely.

The compounded formulation can be strained to remove undesirable extraneous matter and then fed into a calender to deposit or apply a continuous sheet of the "rubber" formulation onto a carrier base (such as a fabric web) to which the compressible layer formulation has been applied, and wound into a continuous roll of a dry laser-engraveable layer on the continuous web.

Controlling the laser-engraveable layer (sheet) thickness is accomplished by adjusting the pressure between the calender rolls and the calendering speed. In some cases, where the laser-engraveable formulation does not stick to the calender rollers, the rollers are heated to improve the tackiness of the formulation and to provide some adhesion to the calender rollers. This continuous roll of calendered material can be vulcanized using a "rotacure" system into which the layers (for example, compressible layer and laser-engraveable layer) are fed under desired temperature and pressure conditions. For example, the temperature can be at least 150° C. and up to and including 180° C. over a period of at least 2 and up to and including 15 minutes. For example, using the peroxide vulcanizing compositions, for example comprising the peroxide product Perkadox® 14/40 (Kayaku Akzo), the curing conditions would can be about 165° C. for about 4 minutes followed by a post-curing stage at a temperature of 240° C. for 120 minutes.

The continuous laser-engraveable layer (for example, on a fabric web with the compressible layer) can then be laminated (or adhered) to a suitable polymeric film such as a polyester film to provide the laser-engraveable layer on a substrate, for example, the fabric web adhered with an adhesive to the polyester film. The continuous laser-engraveable layer can be ground using suitable grinding apparatus to provide a uniform smoothness and thickness in the continuous laser-engraveable layer. The smooth, uniformly thick laser-engraveable layer can then be cut to a desired size to provide suitable flexographic printing plate precursors of this invention.

The process for making flexographic printing sleeves is similar but the compounded laser-engraveable layer formulation can be applied or deposited around a printing sleeve core on which a compressible layer has been disposed, and processed to form a continuous laser-engraveable flexographic printing sleeve precursor that is then vulcanized in a suitable manner and ground to a uniform thickness using suitable grinding equipment.

Similarly, a continuous calendered laser-engraveable layer on a fabric web having a compressible layer can be deposited around a printing cylinder and processed to form a continuous flexographic printing cylinder precursor.

The flexographic printing precursor can also be constructed with a suitable protective layer or slip film (with release properties or a release agent) in a cover sheet that is removed prior to laser-engraving. The protective layer can be a polyester film [such as poly(ethylene terephthalate)] forming the cover sheet.

Laser-Engraving Imaging to Prepare Flexographic Printing Members, and Flexographic Printing Laser engraving can be accomplished using a near-IR radiation emitting diode or carbon dioxide or Nd:YAG laser. It is desired to laser engrave the laser-engraveable layer and optionally, the compressible layer also if present, to provide a relief image with a minimum dry depth of at least 50 μm or typically of at least 100 μm. More likely, the minimum relief image depth is at least 300 μm and up to and including 4,000 μm or up to 1,000 μm being more desirable. Relief is defined as the difference measured between the floor of the imaged flexographic printing member and its outermost printing surface. The relief image can have a maximum depth up to 100% of the original total dry thickness of both of the laser-engraveable layer and compressible layer if they is disposed directly on a substrate. In such instances, the floor of the relief image can be the substrate if both layers are completely removed in the imaged regions. A semiconductor near-infrared radiation laser or array of such lasers operating at a wavelength of at least 700 nm and up to and including 1400 nm can be used, and a diode laser operating at from 800 nm and up to and including 1250 nm is particularly useful for laser-engraving.

Generally, laser-engraving is achieved using at least one near-infrared radiation laser having a minimum fluence level of at least 20 $J/cm^2$ at the imaged surface and typically near-infrared imaging fluence is at least 20 $J/cm^2$ and up to and including 1,000 $J/cm^2$ or typically at least 50 $J/cm^2$ and up to and including 800 $J/cm^2$.

A suitable laser engraver that would provide satisfactory engraving is described in WO 2007/149208 (Eyal et al.) that is incorporated herein by reference. This laser engraver is considered to be a "high powered" laser ablating imager or engraver and has at least two laser diodes emitting radiation in one or more near-infrared radiation wavelengths so that imaging with the one or more near-infrared radiation wavelengths is carried out at the same or different depths relative to the outer surface of the laser-engraveable layer. For example, the multi-beam optical head described in the noted publication incorporates numerous laser diodes, each laser diode having a power in the order of at least 10 Watts per emitter width of 100 μm. These lasers can be modulated directly at relatively high frequencies without the need for external modulators.

Thus, laser-engraving (laser imaging) can be carried out at the same or different relief image depths relative to the outer surface of the laser-engraveable layer using two or more laser diodes, each laser diode emitting near-infrared radiation in one or more wavelengths.

Other imaging (or engraving) devices and components thereof and methods are described for example in U.S. Patent Application Publications 2008/0153038 (Siman-Tov et al.) describing a hybrid optical head for direct engraving, 2008/0305436 (Shishkin) describing a method of imaging one or more graphical pieces in a flexographic printing plate precursor on a drum, 2009/0057268 (Aviel) describing imaging devices with at least two laser sources and mirrors or prisms put in front of the laser sources to alter the optical laser paths, and 2009/0101034 (Aviel) describing an apparatus for providing an uniform imaging surface, all of which publications are incorporated herein by reference. In addition, U.S. Patent Application Publication 2011/0014573 (Matzner et al.) describes an engraving system including an optical imaging head, a printing plate construction, and a source of imaging near-infrared radiation, which publication is incorporated herein by reference. U.S. Patent Application Publication 2011/0058010 (Aviel et al.) describes an imaging head for 3D imaging of flexographic printing plate precursors using multiple lasers, which publication is also incorporated herein by reference.

Thus, a system for providing flexographic printing members including flexographic printing plates, flexographic printing cylinders, and flexographic printing sleeves includes one or more of the flexographic printing precursors described above, as well as one or more groups of one or more sources of imaging (engraving) near-infrared radiation, each source capable of emitting near-infrared radiation (see references cited above) of the same or different wavelengths. Such imaging sources can include but are not limited to, laser diodes, multi-emitter laser diodes, laser bars, laser stacks, fiber lasers, and combinations thereof. The system can also include one or more sets of optical elements coupled to the sources of imaging (engraving) near-infrared radiation to direct imaging near-infrared radiation from the sources onto the flexographic printing precursor (see references cited above for examples of optical elements).

Engraving to form a relief image can occur in various contexts. For example, sheet-like elements can be imaged and used as desired, or wrapped around a printing sleeve core or cylinder form before imaging. The flexographic printing precursor can also be a flexographic printing sleeve precursor or flexographic printing cylinder precursor that can be imaged.

During imaging, products from the engraving can be gaseous or volatile and readily collected by vacuum for disposal or chemical treatment. Any solid debris from engraving can be collected and removed using suitable means such as vacuum, compressed air, brushing with brushes, rinsing with water, ultrasound, or any combination of these.

During printing, the resulting flexographic printing plate, flexographic printing cylinder, or printing sleeve is typically inked using known methods and the ink is appropriately transferred to a suitable substrate such as papers, plastics, fabrics, paperboard, metals, particle board, wall board, or cardboard.

After printing, the flexographic printing plate or sleeve can be cleaned and reused and a flexographic printing cylinder can be scraped or otherwise cleaned and reused as needed. Cleaning can be accomplished with compressed air, water, or a suitable aqueous solution, or by rubbing with cleaning brushes or pads.

Some additional embodiments include:

A method of preparing the flexographic printing plate precursor of this invention comprising:

- providing a non-CLCB EPDM elastomer rubber, or a mixture of a non-CLCB EPDM elastomeric rubber and a non-EPDM elastomeric rubber,
- adding additional components (near-infrared radiation absorbers, vulcanizing compositions, inorganic non-infrared radiation absorber filler), and compounding to provide a compounded mixture using, for example, a two-roll mill,
- causing vulcanization in the continuous laser-engraveable layer, and
- laminating a polymer (such as a polyester) film to the continuous laser-engraveable layer to provide a continuous laminated flexographic laser-engraveable precursor.

This method can further comprise grinding the continuous laser-engraveable layer or the continuous laminated flexographic laser-engraveable precursor.

In these methods, the continuous laminated web can further comprise a fabric layer between the polyester support and the continuous infrared radiation ablatable layer, and there can be an adhesive between the fabric layer and the polyester support.

In still other methods, a flexographic printing sleeve precursor can be prepared by:

- providing a non-CLCB EPDM elastomeric rubber, or a mixture of a non-CLCB EPDM elastomeric rubber and a non-EPDM elastomeric rubber,
- adding additional components (near-infrared radiation absorbers, vulcanizing compositions, inorganic non-infrared radiation absorber filler), and compounding to provide a compounded mixture using, for example, a two-roll mill,
- applying the compounded mixture to a printing sleeve core over which a compressible layer is disposed to provide a continuous laser-engraveable layer on the sleeve core,
- causing vulcanization in the continuous laser-engraveable layer, and
- smoothing the continuous laser-engraveable layer, for example, by grinding, to a uniform thickness.

A method of providing a flexographic printing plate or sleeve comprises:

- imaging the flexographic printing precursor of this invention using near-infrared radiation to provide a relief image in the near-infrared radiation ablatable layer. This imaging can be carried out using a laser at a power of at least 20 J/cm$^2$. The method can further comprise removal of debris after imaging, such as for example, by vacuum, compressed air, brushes, rinsing with water, ultrasound, or any combination of these.

The imaging of this method can be carried out using a high power laser ablating imager, for example, wherein imaging is carried out at the same or different depths relative to the surface of the near-infrared radiation ablatable layer using two or more laser diodes each emitting radiation in one or more wavelengths.

The following Invention Example illustrates the practice of this invention and is not meant to be limiting in any manner.

Trigonox® 17 is butyl 4,4-di(t-butylperoxy)valerate and Trigonox® 29-40 is 1,1-bis(t-butylperoxy)-3,3,5-trimethylcyclohexane, and both are available commercially, for example, from AkzoNobel.

Perkadox® BC is dicumyl peroxide.

HVA-2 co-reagent is N,N'-(m-phenylene)dimaleimide (70% active).

INVENTION EXAMPLES 1 AND 2

The components shown below in TABLE I were formulated into laser-engraveable layers in the noted amounts and the results in Δ torque and $t_{90}$ as also noted. The laser-engraveable composition formulations were mixed for about 20 minutes in the Banbury mixer until a constant stress reading was observed on the Banbury mixer. Each resulting composition was removed from the Banbury mixer as a homogenous lump that was fed onto a two roller mill and the peroxides were then added.

Each milled formulation was then fed through a calendar at a temperature within the range of from 30° C. to 80° C. in combination with a fabric base. The calendar gap was pre-set to desired thickness requirements. The resulting continuous roll of laminated laser-engraveable layer and fabric web was fed into an autoclave at 135° C. for a suitable period of time, and after cooling, the continuous roll to room temperature, it was laminated to a 125 μm poly(ethylene terephthalate) film and post-cured in an autoclave at 120° C. to provide a flexographic printing plate precursor that was continuously ground to provide a uniform thickness using a buffing machine.

TABLE I

| | Invention Example 1 (phr) | Invention Example 2 (phr) |
|---|---|---|
| Non-CLCB EPDM, Keltan ® 4331A | 150 | 105 |
| Nordel 4725 | 0 | 30 |
| Factic oil | 0 | 10 |
| Silica | 25 | 25 |
| Vinyl silane | 1.5 | 1.5 |
| Calcium carbonate | 30 | 30 |
| Carbon black | 24 | 24 |
| Zinc oxide | 5 | 5 |
| Stearic acid | 1 | 1 |
| HVA-2 co-reagent | 2.14 | 2.14 |
| Trigonox ® 29-40 peroxide | 5 | 5 |
| Perkadox ® BC peroxide | 5 | 5 |
| $t_{90}$ of laser engraveable composition (seconds) | 3.6 | 4.6 |
| Δ ($M_H$ − $M_L$) | 13 | 14 |

The results shown in TABLE I demonstrate optimum use of a particular peroxide mixture in the vulcanization composition for each laser-engraveable composition. The compositions for Invention Examples 1 and 2 provided high enough torque and a useful cure time ($t_{90}$) value to provide desired production efficiency.

The choice of useful peroxides in a mixture for this invention can depend upon the optimal cure time at various temperatures. T $t_{90}$ values for some useful commercially available peroxides are shown in the following TABLE II.

TABLE II

| Peroxide | $t_{90}$ at 160° C. (minutes) |
|---|---|
| Perkadox ® BC peroxide | 16 |
| Trigonox ® 29 peroxide | 2 |
| Trigonox ® 17 peroxide | 6 |

COMPARATIVE EXAMPLES 1 AND 2

Invention Example 2 was repeated to prepare laser-engraveable compositions and flexographic printing precursors using different combinations of two peroxides, but each has a $t_{90}$ value within the same range. Each of the peroxides is a "first" peroxide according to the present invention. The amounts are shown in the following TABLE III in phr.

TABLE III

| Peroxide | Comparative Example 1 | Comparative Example 2 |
|---|---|---|
| Trigonox ® 29 peroxide | 5 phr | 4 phr |
| Trigonox ® 17 peroxide | 3 phr | 4 phr |
| $t_{90}$ (seconds) | 1.7 | 1.7 |
| $\Delta$ ($M_H - M_L$) | 10 | 12 |

It can be seen from these results that the torque value for the laser-engraveable composition was undesirably low and the $t_{90}$ value (curing time) was too fast for practical production methods.

COMPARATIVE EXAMPLE 3

A laser-engraveable composition (layer) and flexographic printing precursor was prepared similarly to Invention Example 1 except that the components of the following TABLE IV were used, which composition included a single peroxide.

TABLE IV

| Component | Amount (phr) |
|---|---|
| EPDM 512 * 50 (from DSM) | 150 |
| Silica | 10 |
| Vinyl Silane | 1.5 |
| Calcium carbonate | 60 |
| Carbon black | 24 |
| Zinc oxide | 5 |
| Stearic acid | 1 |
| HVA-2 co-reagent | 2.14 |
| Trigonox ® 29-40 peroxide | 12 |
| $t_{90}$ (seconds) | 0.7 |
| $\Delta$ ($M_H - M_L$) | 8.4 |

The results shown in TABLE IV demonstrate that the torque value of the laser-engraveable composition was undesirably low and the curing time ($t_{90}$) was too fast for practical production methods.

The invention has been described in detail with particular reference to certain preferred embodiments thereof, but it will be understood that variations and modifications can be effected within the spirit and scope of the invention.

The invention claimed is:

1. A method for providing a flexographic printing member, comprising:

imaging a laser-engraveable layer of a flexographic printing precursor using near-infrared radiation to provide a flexographic printing member with a relief image in the resulting laser-engraved layer, the flexographic printing precursor comprising a laser-engraveable layer being prepared from a laser-engraveable composition comprising one or more EPDM elastomeric rubbers in an amount of at least 30 weight % and up to and including 80 weight %, based on the total laser-engraveable composition weight, the laser-engraveable composition being essentially free of CLCB EPDM elastomeric rubbers, the laser-engraveable composition further comprising at least 2 phr and up to and including 90 phr of a near-infrared radiation absorber, and at least 3 phr and up to and including 20 phr of a vulcanizing composition that comprises a mixture of at least first and second peroxides, the vulcanizing composition being essentially free of sulfur vulcanizing compounds, wherein:

the first peroxide has a $t_{90}$ value of at least 1 minute and up to and including 6 minutes as measured at 160° C., the second peroxide has a $t_{90}$ value of at least 16 minutes and up to and including 40 minutes as measured at 160° C., the molar ratio of the first peroxide to the second peroxide is at least 1:20 and to and including 1:2.67, the laser-engraveable composition exhibits a $t_{90}$ that is greater than 1.7 seconds, the laser-engraveable layer has a $\Delta$ torque ($M_\Delta = M_H - M_L$) of at least 13 and up to and including 22, and the weight ratio of the near-infrared radiation absorber to the vulcanizing composition in the laser-engraveable composition is from 1:5 to and including 5:1.

2. The method of claim 1, comprising imaging to provide a minimum dry relief image depth of at least 50 μm.

3. The method of claim 1, wherein the laser-engraveable layer is disposed over a substrate.

4. The method of claim 1, wherein the flexographic printing precursor further comprises a compressible layer on a substrate, and the laser-engraveable layer is disposed on the compressible layer.

5. The method of claim 4, wherein the compressible layer comprises one or more elastomeric resins.

6. The method of claim 5, wherein the compressible layer further comprises microspheres in an amount of at least 2 and up to and including 30 phr.

7. The method of claim 1, wherein the laser-engraveable composition comprises a conductive or non-conductive carbon black, graphene, graphite, carbon fibers, or carbon nanotubes as the near-infrared radiation absorber in an amount of at least 5 phr and up to and including 30 phr.

8. The method of claim 1, wherein the flexographic printing member further comprises a substrate that comprises one or more layers of a metal, fabric, or polymeric film, or a combination thereof.

9. The method of claim 8, wherein the substrate comprises a fabric web disposed over a polyester support.

10. The method of claim 1, wherein the laser-engraveable layer has a dry thickness of at least 50 μm and up to and including 4,000 μm.

11. The method of claim 1, wherein the first peroxide is selected from the group consisting of t-butyl peroxybenzoate, 1,1'-bis(t-butylperoxy)-3,3,5-trimethylcyclohexane, t-butylperoxy 2-ethylhexyl carbonate, and butyl 4,4'-di (t-butylperoxy)valerate, and the second peroxide is selected from the group consisting of di(t-butylperoxyisopropyl) benzene, dicumyl peroxide, t-butyl cumyl peroxide, and 2,5-dimethyl-2,5 bis(t-butyl) peroxy)hexane.

12. The method of claim 11, wherein the laser-engraveable composition further comprises one or more co-reagents at a molar ratio of from 1:6 to and including 25:1 in relation to the total peroxides, which one or more co-reagents are selected from the group consisting of triallyl cyanurate, triallyl isocyanurate, triallyl trimellitate, esters of acrylic and methacrylic acids with polyvalent alcohols, trimethylpropane trimethacrylate, trimethylolpropane triacrylate, ethylene glycol dimethacrylate, and N,N'-m-phenylenedimaleimide.

13. The method of claim 1, wherein the laser-engraveable composition further comprises one or more co-reagents at a molar ratio of from 1:6 to and including 25:1 in relation to the total peroxides, which one or more co-reagents are selected from the group consisting of triallyl cyanurate, triallyl isocyanurate, triallyl trimellitate, esters of acrylic and methacrylic acids with polyvalent alcohols, trimethylpropane trimethacrylate, trimethylolpropane triacrylate, ethylene glycol dimethacrylate, and N,N'-m-phenylenedimaleimide.

14. The method of claim 1, wherein the near-infrared radiation absorber is a carbon black.

15. The method of claim 1, wherein the first peroxide is 1,1-bis(t-butylperoxy)-3,3,5-trimethylcyclohexane, the second peroxide is dicumyl peroxide, and the laser-engraveable composition further comprises N,N'-(m-phenylene)dimaleimide as a co-reagent.

* * * * *